Nov. 3, 1970    R. T. HALES ET AL    3,537,272
EXPANSION VALVE CONTROL INCLUDING PLURAL SENSORS
Filed Aug. 22, 1968

Inventors
Richard Thomas Hales
Brian Cecil Oliver
By
Michael J. Striker
Attorney

3,537,272
EXPANSION VALVE CONTROL INCLUDING PLURAL SENSORS

Richard Thomas Hales, Bexley, Kent, and Brian Cecil Oliver, Upper Belvedere, Kent, England, assignors to Hall-Thermotank International Limited, London, England, a British company
Filed Aug. 22, 1968, Ser. No. 754,571
Int. Cl. F25b 41/06
U.S. Cl. 62—157            3 Claims

ABSTRACT OF THE DISCLOSURE

This invention relates to the refrigeration plant comprising a compressor, a condenser, an electrically controlled expansion valve and an evaporator linked in a condenser, an electrically controlled expansion valve thermo-electric devices mounted in thermal contact with the refrigerant of the plant at points spaced apart in the low pressure side of the plant and an electrical control unit to control the opening and closing of the expansion valve in dependence on the difference in electrical output from said devices.

---

Figure 1:
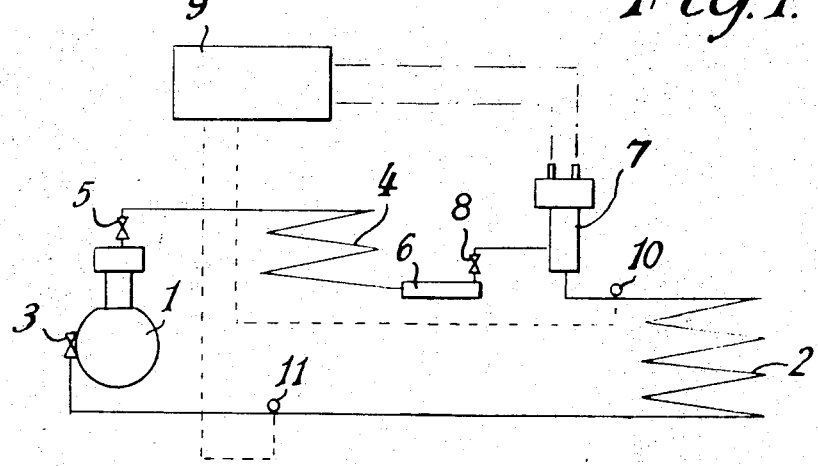

This invention relates in particular to the control of expansion valves in compression-refrigeration plant.

According to the invention, in a refrigeration plant in which refrigerant is circulated through a compressor, a condenser, an electrically controlled expansion valve and an evaporator, and in which actuation of the expansion valve is controlled in dependence on the difference in temperature between the refrigerant as sensed between two points in the low pressure side of the plant, control means is provided comprising first and second thermo-electric devices each mounted in thermal contact with the refrigerant and an electrical control unit for actuating the expansion valve in dependence on the difference in electrical output from said thermo-electric devices.

In a typical arrangement, the points in the low pressure side of the plant at which refrigerant temperature is sensed are in the pipe connecting the expansion valve to the evaporator and in the suction pipe connecting the evaporator to the compressor, the thermo-electric device ment both points may be in the suction pipe connecting the evaporator to the compressor, the thermo-electric device which is closest to the compressor being in contact with liquid refrigerant metered from the high pressure side of the plant.

Any form of electrically controlled expansion valve may be employed, but it is preferred to use a magnetic valve of the type described in U.S. patent specification No. 2,828,936.

It has already been proposed, in a vapour-compression refrigeration plant to use vapour pressure type thermostatic controllers for operating magnetic valves by sensing the temperature difference between the expansion pipe connecting the expansion valve to the evaporator, and the suction pipe connecting the evaporator to the compressor. These vapour pressure type controllers employ sealed phials of a volatile fluid, each phial being strapped to, or inserted into a pipe, temperature sensing being effected by pressure changes occurring in the phials.

These controllers operating with magnetic valves, are an improvement over the more conventional thermostatic expansion valves, which use a temperature sensitive pressure phial and the internal expansion pressure or equalised pressure from the suction line, to operate the valve by differential pressure, and the standard type of magnetic valve controller for low temperatures which works on a similar principle to the thermostatic expansion valve comparing the pressure in a sealed phial, containing refrigerant identical with or similar to that in the system, and strapped to the suction pipe between the evaporator and the compressor, with the pressure in the plant between the evaporator and the compressor.

Control systems such as described above suffer from the main disadvantages that they make use of a volatile fluid which has a pressure temperature relationship curve of varying slope and in particular that at very low temperatures a large change in temperature is required to effect a small change in pressure.

In the case of a conventional thermostatic expansion valve which uses a temperature sensitive pressure phial opposing the internal expansion pressure or equalised pressure from the suction pipe line to operate the valve mechanically by differential pressure the effect is that a differential at $+50°$ F. of $2°$ F. may become as high as $20°$ F. at $-50°$ F. At even lower temperatures this differential becomes even greater resulting in the complete failure of the valve to control (resulting in what is known as a thermostatic shut down).

In the case of the controllers for use with magnetic expansion valves these are so designed as to overcome the chief cause of failure of the conventional mechanically operated thermostatic expansion valve namely thermostatic shut down, but since they also use a volatile fluid which has a varying temperature pressure relationship it is necessary as with the conventional thermostatic expansion valves to use several different volatile fluids to cover a temperature range of say $+50°$ F. to $-200°$ F. Also, in order to obtain maximum sensitivity, the temperature sensitive pressure phials employed in the above-described control systems are relatively fragile and are liable to fatigue failure. It is a feature of the present invention that one controller, which is free from any of the disadvantages of the above described controls which have been discussed above, can be used to cover a wide range of refrigerant temperatures, from say $+50°$ F. to $-200$ F., and for all known refrigerants.

In the present invention, the temperature difference is sensed directly with thermo-electric devices such as thermo-couples, resistance thermometers, thermistors or similar thermo-electric devices. The electrical output developed by the difference in temperature sensed by these devices can be amplified by either a thermionic valve amplifier, a magnetic amplifier or an amplifier utilising semi-conductors, to control the expansion valve.

In the preferred embodiment of the present invention thermistors are used as the thermo-electric devices for sensing the temperature of the refrigerant in the plant and semi-counductor devices (e.g. transistors) are used for amplification. A device is incorporated which ensures that the expansion valve is open for a period of not more than 30 seconds when the main power supply to the controller is switched on. The purpose of this devce is to establish a temperature differential between the two thermo-electric devices when the refrigeration plant is started under conditions where the two temperatures are equal or below the control point.

Preferably the control unit includes a first adjustable rheostat to allow the temperature differential between the two thermo-electric devices to be adjusted between 0° F. and 30° F. or higher if required, and a second adjustable rheostat to allow the switching differenial (i.e. the change in temperature of a thermo-electric device necessary to actuate the expansion valve) to be adjusted between ¼° F. and 5° F. or lower or higher as required.

The operating voltage of the electrically controlled valve is preferably kept low, for example not more than 12 volts, but if desired higher voltages up to 240 volts could be utilised.

According to a further aspect of the invention, a method of controlling the operation of an expansion valve in a compression refrigeration plant comprises sensing the differenme in the electrical output between two thermo-electric devices in thermal contact with the refrigerant of the plant in spaced-apart regions of the low pressure side of the plant and actuating an electrically controlled expansion valve in dependence as said difference.

Figure 2:
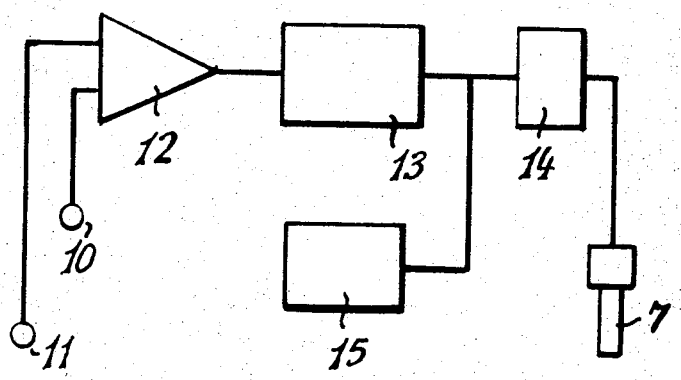

The invention will now be further described, by way of example, with reference to the accompanying drawing, in which:

FIG. 1 is a schematic view of a compression refrigeration plant equipped with a control means in accordance with the invention, and FIG. 2 is a block circuit diagram of the control unit employed in the plant of FIG. 1.

Referring to FIG. 1, the refrigeration plant comprises a compressor 1 drawing refrigerant vapour from an evaporator 2 though a suction valve 3 and delivering it at a higher pressure to a condenser 4 through a delivery valve 5. The condensed refrigerant passes to a liquid receiver 6 and onto an expansion valve 7 through a valve 8. Expansion valve 7 is electrically actuated and is preferably a solenoid operated magnetic expansion valve of the type described in the specification of our U.S. Pat. No. 2,828,936. Finally the refrigerant passes at a reduced pressure back to the evaporator 2. The operation of the expansion valve 7 is controlled by a control unit 9 and two thermistor probes 10 and 11, in good thermal contact with the refrigerant in the low pressure side of the plane (i.e. in the pipe connecting the expansion valve 7 to the evaporator 2 and in the suction pipe connecting the evaporator 2 to the compressor 1, respectively).

The difference between the electrical outptus of the two probes (which difference represents the temperature difference between the refrigerant in the two pipes) is fed as the input to a semi-conductor amplifier 12, the output of which feeds an output stage 14 energising the valve 7.

FIG. 2 shows in block form the arrangement within the control unit 9.

The probes 10 and 11 feed their output to a transistorised low drift differential D.C. amplifier 12 so that the output of the amplifier (which is fed to a voltage sensitive threshold circuit 13) is proportional to the temperature difference sensed by the probes. An output stage 14 (which can be a relay) controls the actuation of the solenoid valve 7 whenever the voltage fed to the circuit 13 exceeds its threshold voltage. It will be seen therefore that the valve 7 is opened and closed in dependence on the temperature difference between the probes 10 and 11. To ensure that the valve 7 is open for a short period (e.g. up to 30 seconds) when the plant is started up, an overriding unit 15 is employed which activates the output stage 14 quite independently of the output from the threshold circuit 13. A timer may be included in the unit 15 so that the control unit 9 reverts to normal control after a predetermined delay, the delay being long enough to enable probe 10 to become sufficiently cold relative to probe 11 to keep the valve 7 open.

The expansion valve 7 remains open and refrigerant is metered into the evaporator 2 until the refrigerant in the pipe between the evaporator 2 and the compressor 1 reaches a temperature of say 10° F., depending upon the value set in the threshold circuit 13 above the temperature of the refrigerant in the pipe between the expansion valve 7 and the evaporator 2.

Upon attaining this differential temperature, current supply from the output stage 14 is switched off and the expansion valve 7 closes and remains closed until the temperature of the refrigerant in the pipe between the evaporator 2 and the compressor 1 rises say 1° F. (or as set by the variable adjustment) when the valve 7 will open and allow more refrigerant to pass into the evaporator 2.

Preferably, the control unit 9 incorporates adjustable rheostats to vary the pre-set value of temperature difference between the probes at which the valve 7 is actuated.

Sensing probes 10 and 11 can be positioned in a variety of positions and attitudes in the low pressure side of the plant depending upon the application. The following are some of the possible positions.

(i) 11 on or in the suction pipe between the compressor 1 and the evaporator 2. 10 on or in the expansion pipe close to the valve 7.

(ii) 11 on or in the suction pipe between the compressor 1 and the evaporator 2. 10 on or in any intermediate pipe of the evaporator 2.

(iii) 11 on or in the suction pipe close to the compressor 1. 10 on or in the suction pipe near to the outlet of the evaporator 2.

(iv) 11 on or in the suction pipe between the compressor 1 and the evaporator 2. 10 in the suction pipe between the compressor 1 and the evaporator 2, but downstream of the probe 11, with an equalising line supplying a small quantity of liquid refrigerant (metered by orifice or capillary from the high pressure side of the plant), to the sensing probe 10 (i.e. probe 10 reads the true saturation temperature).

System (iv) has much to commend it and is a direct attempt to measure the saturation and superheated temperatures of the refrigerant passing along the suction pipe to the compressor.

The great advantage of the control means described is that it is self-contained and does not directly use the refrigerant in the refrigerant plant. It may, therefore, be used for any compression refrigeration plant no matter what the refrigerant in that plant is or how high or how low it is operating at.

It is a further advantage of a control means in accordance with the invention that it does not employ components that can fail owing to fatigue, such as metal bellows units.

What is claimed is:

1. In a refrigeration plant comprising a compressor, a condenser, a solenoid-operated magnetic expansion valve and an evaporator connected in a compression-refrigeration circuit, the provision of first and second temperature sensitive electrical devices mounted in thermal contact with the refrigerant in the circuit at points spaced apart in the low-pressure side of the plant, at least one of said devices being located outside the evaporator; a voltage-sensitive threshold circuit, the output from said temperature-sensitive devices being fed to said circuit and from said circuit via an output stage to the solenoid of the expansion valve for periodically energising the same during normal operation of the plant to open and close said expansion valve in dependence on the difference in the electrical output from said devices; and means for overriding normal operation of the threshold circuit for a predetermined period immediately following starting of the compressor to ensure that the expansion valve is open at least for said predetermined period to allow the establishment of a temperature difference between said temperature-sensitive electrical devices sufficient to permit said threshold circuit to take over control of the expansion valve, said overriding means comprising a timer and means to activate the output stage for said predetermined period.

2. A refrigeration plant as defined in claim 1, in which the two points at which the temperature-sensitive electrical control devices are located are both in the suction pipe connecting the evaporator to the compressor, the temperature-sensitive electrical device which is closest to the compressor being in contact with liquid refrigerant metered from the high-pressure side of the plant.

3. A refrigeration plant as defined in claim 1, wherein the temperature-sensitive electrical devices are both thermistors whose output is fed to the threshold circuit via a transistorised differential D.C. amplifier.

References Cited

UNITED STATES PATENTS

| 2,449,437 | 9/1948 | Winchester | 62—212 |
| 2,534,455 | 12/1950 | Koontz | 62—223 XR |
| 2,583,178 | 1/1952 | Huntington | 62—223 |

MEYER PERLIN, Primary Examiner

U.S. Cl. X.R.

62—212, 223